(12) United States Patent
Tomimatsu et al.

(10) Patent No.: US 12,275,018 B2
(45) Date of Patent: Apr. 15, 2025

(54) ELECTROSTATIC PRECIPITATOR

(71) Applicant: MITSUBISHI HEAVY INDUSTRIES POWER ENVIRONMENTAL SOLUTIONS, LTD., Kanagawa (JP)

(72) Inventors: Kazutaka Tomimatsu, Kanagawa (JP); Masaya Kato, Kanagawa (JP); Takao Tanaka, Kanagawa (JP); Yasutoshi Ueda, Tokyo (JP)

(73) Assignee: MITSUBISHI HEAVY INDUSTRIES POWER ENVIRONMENTAL SOLUTIONS, LTD., Yokohama (JP)

( * ) Notice: Subject to any disclaimer, the term of this patent is extended or adjusted under 35 U.S.C. 154(b) by 488 days.

(21) Appl. No.: 17/264,052

(22) PCT Filed: Aug. 1, 2018

(86) PCT No.: PCT/JP2018/028777
§ 371 (c)(1),
(2) Date: Jan. 28, 2021

(87) PCT Pub. No.: WO2020/026370
PCT Pub. Date: Feb. 6, 2020

(65) Prior Publication Data
US 2021/0283621 A1 Sep. 16, 2021

(51) Int. Cl.
*B03C 3/51* (2006.01)
*B03C 3/02* (2006.01)
(Continued)

(52) U.S. Cl.
CPC .............. *B03C 3/51* (2013.01); *B03C 3/025* (2013.01); *B03C 3/08* (2013.01); *B03C 3/47* (2013.01); *B03C 2201/14* (2013.01)

(58) Field of Classification Search
CPC .... B03C 3/06; B03C 3/47; B03C 3/08; B03C 3/40; B03C 3/49; B03C 3/02; B03C 3/09;
(Continued)

(56) References Cited

U.S. PATENT DOCUMENTS 1,400,795 A * 12/1921 Bradley ............... B03C 3/36
313/356
4,342,571 A * 8/1982 Hayashi ............... B03C 3/41
96/76
(Continued)

FOREIGN PATENT DOCUMENTS

| CN | 1551432 A | 12/2004 |
| CN | 104994960 A | 10/2015 |

(Continued)

OTHER PUBLICATIONS

Office Action for Chinese Application No. 201880096093.9 mailed Jun. 24, 2022; 15pp.
(Continued)

*Primary Examiner* — Christopher P Jones
*Assistant Examiner* — Sonji Turner
(74) *Attorney, Agent, or Firm* — HAUPTMAN HAM, LLP (57) ABSTRACT

An electrostatic precipitator includes a collecting electrode provided along a gas flow direction, including a plurality of openings being formed in the collecting electrode, and a discharge electrode arranged in parallel with the collecting electrode. The discharge electrode includes a plurality of corona discharge portions for corona discharge, the plurality of corona discharge portions are continuously provided in the gas flow direction, and are protruding toward only one collecting electrode of the collecting electrodes that face each other. A plurality of collecting electrodes and a plurality of discharge electrodes are alternately arranged in a direc-
(Continued)

tion orthogonal to a gas flow direction. In each of the upstream region and the downstream region in the gas flow direction, all of the corona discharge portions protrude in the same direction.

3 Claims, 6 Drawing Sheets (51) Int. Cl.
*B03C 3/08* (2006.01)
*B03C 3/47* (2006.01)

(58) Field of Classification Search
CPC .... B03C 3/41; B03C 3/45; B03C 3/51; B03C 2201/10
See application file for complete search history.

(56) References Cited

U.S. PATENT DOCUMENTS

| | | | | |
|---|---|---|---|---|
| 5,059,219 | A | * 10/1991 | Plaks | B03C 3/36 96/96 |
| 5,322,550 | A | * 6/1994 | Park | B03C 3/41 96/97 |
| 2005/0082160 | A1 | * 4/2005 | Botvinnik | B03C 3/09 422/186.04 |
| 2006/0278082 | A1 | 12/2006 | Tomimatsu et al. | |
| 2015/0375237 | A1 | * 12/2015 | Kojima | B03C 3/78 96/84 |
| 2021/0060578 | A1 | 3/2021 | Tomimatsu et al. | |

FOREIGN PATENT DOCUMENTS

| | | | | |
|---|---|---|---|---|
| CN | 105312158 | A | 2/2016 | |
| EP | 2881177 | A1 | 6/2015 | |
| EP | 3725412 | A1 | 10/2020 | |
| JP | 65190074 | A | 8/1976 | |
| JP | 860209274 | A | 10/1985 | |
| JP | 861125455 | A | 6/1986 | |
| JP | 861164660 | A | 7/1986 | |
| JP | 8627456 | A | 1/1987 | |
| JP | H07108189 | A * | 4/1995 | |
| JP | H07155641 | A | 6/1995 | |
| JP | H07265735 | A | 10/1995 | |
| JP | H07299387 | A | 11/1995 | |
| JP | H1034015 | A | 2/1998 | |
| JP | 2001017884 | A | 1/2001 | |
| JP | 2003269133 | A * | 9/2003 | |
| JP | 2004342542 | A * | 12/2004 | |
| JP | 4823691 | B2 * | 11/2011 | ............ B03C 3/40 |
| JP | 2011245429 | A * | 12/2011 | |
| JP | 5705461 | B2 | 4/2015 | |
| JP | 5761461 | B2 | 8/2015 | |
| JP | 2016073954 | A * | 5/2016 | ............ B03C 3/025 |
| JP | 2016203138 | A | 12/2016 | |
| JP | 2017023894 | A | 2/2017 | |
| JP | 2018126713 | A | 8/2018 | |
| RU | 2071835 | C1 | 1/1997 | |
| TW | M534033 | U | 12/2016 | |
| WO | WO-2011152357 | A1 * | 12/2011 | ............ B01D 46/02 |
| WO | WO-2014006736 | A1 * | 1/2014 | ............ B03C 3/06 |
| WO | 2014123202 | A1 | 8/2014 | |
| WO | WO-2016056254 | A1 * | 4/2016 | ............ B03C 3/025 |

OTHER PUBLICATIONS

International Search Report and Written Opinion of International Application No. PCT/JP2018/028777 mailed Oct. 23, 2018; 19pp.
Office Action for Japanese Application No. 2017-023154 mailed Mar. 24, 2020; 6pp.
Extended European Search Report for European Application No. 18928611.5 mailed Jun. 7, 2021; 10pp.
Office Action for European Application No. 18928611.5 mailed Dec. 14, 2023; 9pp.

* cited by examiner

ELECTROSTATIC PRECIPITATOR

RELATED APPLICATIONS

The present application is a National Phase of International Application Number PCT/JP2018/028777 filed Aug. 1, 2018.

TECHNICAL FIELD

The present invention relates to an electrostatic precipitator.

BACKGROUND ART

A conventional electrostatic precipitator is known to include a plate-like collecting electrode arranged in parallel along a gas flow and a discharge electrode having a sharp shape located at the center of the collecting electrodes adjacent to each other.

In the electrostatic precipitator, a DC high voltage is applied between a collecting electrode and a discharge electrode to perform stable corona discharge on the discharge electrode, thereby charging dust in a gas flow. The conventional dust collecting theory explains that the charged dust is collected by the collecting electrode due to the action of the Coulomb force acting on the dust under the electric field between the discharge electrode and the collecting electrode.

The electrostatic precipitator of Patent Document 1 and 2 include a collecting electrode including a plurality of through holes for passing dust and a closed space inside the collecting electrode for collecting dust. In Patent Document 1 and 2, the dust is confined in the closed space through the through holes, so that the collected dust is less likely to be scattered again.

The electrostatic precipitator of Patent Document 3 includes a collecting electrode including a ground electrode having an aperture ratio of 65% to 85% and a collecting filter layer for collecting dust. In Patent Document 3, by providing such a collecting electrode, an ionic wind is generated in a cross section orthogonal to the gas flow, a spiral gas flow circulating between the discharge electrode and the collecting electrode is generated, and dust is efficiently collected. In Patent Document 3, the ionic wind is actively used, but this case is mainly intended to collect dust by the collecting filter layer.

CITATION LIST

Patent Literature

Patent Document 1: JP 5761461 B
Patent Document 2: JP 5705461 B
Patent Document 3: JP 4823691 B

SUMMARY OF INVENTION

Technical Problem

The collection efficiency η in the electrostatic precipitator can be calculated by the following well-known Deutsch formula (Equation (1)). In the equation (1), w is a dust collection index (particulate migration velocity), and f is a dust collecting area per unit actual gas volume.

$$\eta = 1 - \exp(-w \times f) \quad (1)$$

In the above equation (1), the particulate migration velocity w is determined by the relationship between the force due to the Coulomb force and the viscous resistance of the gas. In the Deutsch formula (the above equation (1)), the dust migrates under the electric field from the discharge electrode, and the ionic wind is not considered directly on the performance. However, there is a prerequisite that the dust concentration, which is a precondition for the performance design, is always uniform in the dust collecting space between the discharge electrode and the collecting electrode, and the ionic wind is considered as one of the factors that cause gas turbulence and thus cause dust concentration to be uniform.

When a negative voltage is applied between the electrodes, negative ions are generated by corona discharge at the discharge electrode, and as a result, the ionic wind is generated, and in the case of a positive voltage, positive ions generate the ionic wind. Hereinafter, a case where a negative voltage is applied will be described in order to consider an industrial electrostatic precipitator as a base, but the same applies to the case where the positive voltage is applied.

The ionic wind generated at the discharge electrode flows toward the collecting electrode so as to cross the gas flow. The ionic wind that has reached the collecting electrode is reversed by the collecting electrode to change the flow direction. This creates a spiral turbulent flow between the electrodes.

Of the turbulent flow, the flow from the discharge electrode toward the collecting electrode has a function of conveying dust to the vicinity of the collecting electrode. The dust carried to the vicinity of the collecting electrode is finally collected by the Coulomb force.

However, the ionic wind reversed by the collecting electrode causes the dust to migrate in a direction away from the collecting electrode, which is a collector, and thus the ionic wind also has a function of inhibiting dust collection.

Patent Document 3 describes an electrostatic precipitator that also takes into consideration the effect of ionic wind. However, in this case, the structure is such that the ionic wind is sent to the filter layer located behind the collecting electrode including the opening, and the purpose is collecting dust at a place which is not affected by the main gas, also the structure is complicated, and it is difficult to separate and collect the attached dust by the dry method.

The present invention has been made in view of the above circumstances, and an object of the present invention is to provide an electrostatic precipitator that can suppress a blow back action of an ionic wind that reduces a collection effect, and can improve collection efficiency, by focusing on the ionic wind that has not been considered in a conventional electrostatic precipitator.

Solution to Problem

In order to solve the above problems, an electrostatic precipitator according to the present invention employs the following means.

That is, an electrostatic precipitator according to one aspect of the present invention includes, a collecting electrode provided along a gas flow direction, including a plurality of openings being formed in the collecting electrode, and a discharge electrode arranged in parallel with the collecting electrode. The discharge electrode includes a plurality of corona discharge portions for corona discharge, the corona discharge portions are continuously provided in the gas flow direction, and are protruding toward only one collecting electrode of the collecting electrodes that face each other.

By providing the plurality of openings in the collecting electrode, part of the ionic wind flowing from the discharge electrode toward the collecting electrode is allowed to escape to the back side of the collecting electrode. Thus, it is possible to suppress a flow in which the ionic wind is reversed by the collecting electrode and blows back.

The discharge electrode includes the plurality of corona discharge portions for corona discharge, the plurality of corona discharge portions are continuously provided in the gas flow direction, and are protruding toward only one collecting electrode of the collecting electrodes that face each other. Thus, since the ionic wind can be made to flow toward only one direction from the plurality of corona discharge portions that are continuously provided in the gas flow direction, the interference of the ionic wind from the corona discharge portions adjacent in the gas flow direction can be reduced as much as possible to enhance the collection efficiency.

Examples of the collecting electrode include a discrete collecting electrode in which a plurality of rigid members are arranged at predetermined intervals in a gas flow direction. Examples of the rigid member include a pipe-shaped member. Another type of collecting electrode includes, for example, a flat plate collecting electrode in which a single plate-shaped body, which includes a plurality of through holes, is provided along the gas flow direction. As the flat plate collecting electrode, for example, a perforated metal is used.

Further, in an electrostatic precipitator according to one aspect of the present invention, a plurality of the collecting electrodes and a plurality of the discharge electrodes are alternately arranged in a direction orthogonal to the gas flow direction, and in a predetermined region in the gas flow direction, all of the plurality of corona discharge portions provided to each of the plurality of discharge electrodes similarly protrude in a first direction.

When the plurality of collecting electrodes and the plurality of discharge electrodes are alternately arranged in the direction orthogonal to the gas flow direction, all of the plurality of corona discharge portions protrude in the same direction in a predetermined region in the gas flow direction. Accordingly, the ionic wind is directed in a uniform direction across the plurality of collecting electrodes in the entire predetermined region, and thus interference of the ionic wind is suppressed and the collection efficiency can be enhanced.

Further, in an electrostatic precipitator according to one aspect of the present invention, in a downstream region that is downstream of the predetermined region, all of the plurality of corona discharge portions provided to each of the plurality of discharge electrodes protrude in a second direction opposite to the first direction.

In the downstream region that is downstream of the predetermined region, all of the plurality of corona discharge portions protrude in the second direction opposite to the corona discharge portions in the predetermined region. Thus, the ionic wind deflected in one direction in the predetermined region is changed in the other direction in the downstream region, whereby the collection efficiency can be further enhanced.

Advantageous Effects of Invention

According to the electrostatic precipitator of the present invention, it is possible to suppress the blow back of the ionic wind from the collecting electrode to improve the collection efficiency.

DESCRIPTION OF EMBODIMENTS

Hereinafter, an embodiment of an electrostatic precipitator according to the present invention will be described with reference to the drawings.

Figure 1:
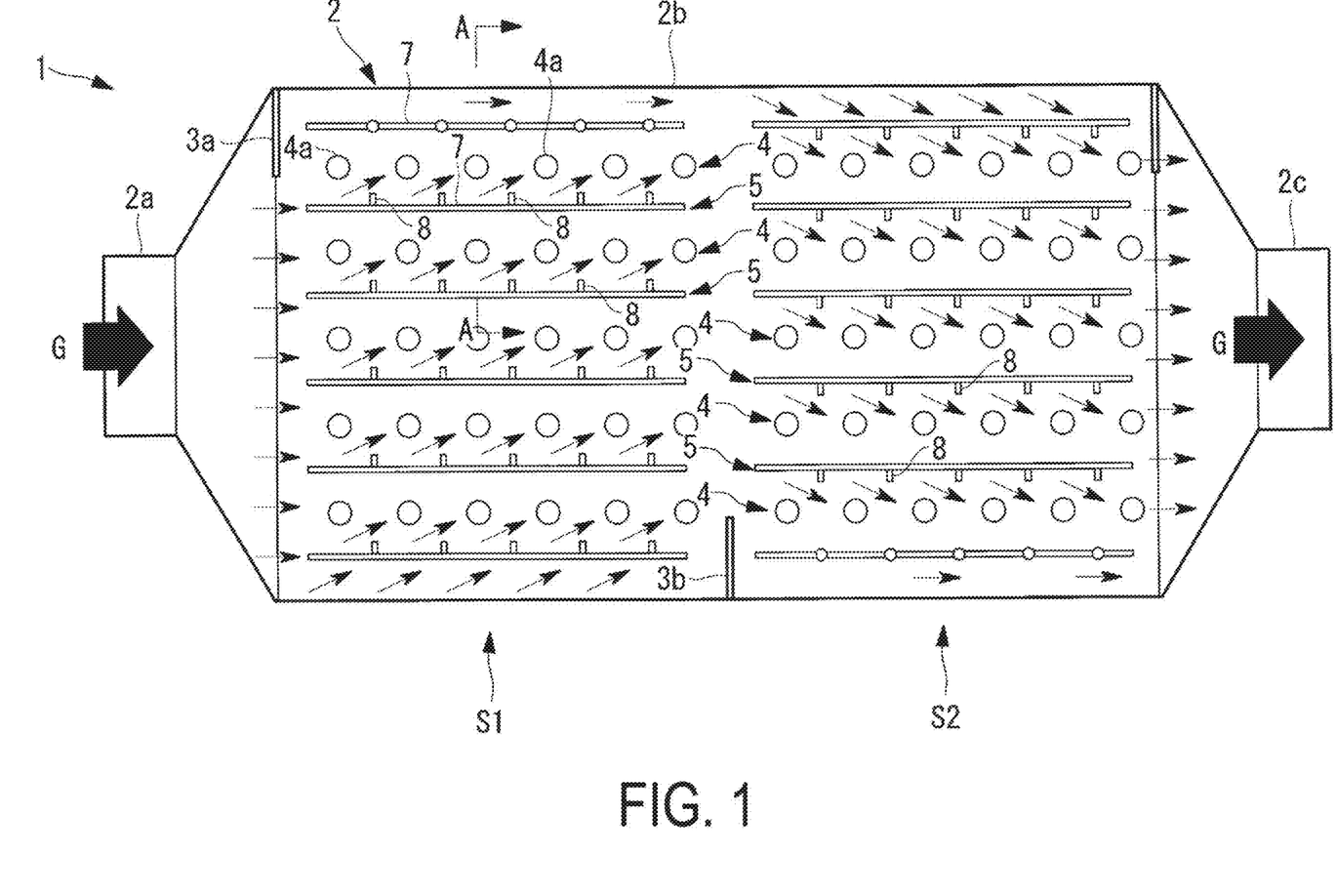
FIG. 1 is a horizontal cross-sectional view of an electrostatic precipitator according to an embodiment of the present invention.

FIG. 1 is a horizontal cross-sectional view of an electrostatic precipitator according to the present embodiment. In FIG. 1, the gas flow G is a horizontal flow that flows from the left side to the right side in the drawing.

The electrostatic precipitator 1 includes, in a casing 2, a plurality of collecting electrodes 4 arranged along a gas flow G, a plurality of discharge electrodes 5 arranged in parallel with the collecting electrodes 4, and a power source (not illustrated).

The casing 2 includes a gas inlet 2a, a main body 2b, and a gas outlet 2c. The gas flowing in from the gas inlet 2a is guided to the main body 2b, dust is collected, and then the gas is discharged to the outside from the gas outlet 2c.

The collecting electrodes 4 and the discharge electrodes 5 provided in the main body 2b of the casing 2 are alternately arranged in a direction orthogonal to the gas flow G. The electrostatic precipitator 1 illustrated in FIG. 1 is a schematic illustration, and the sizes and the installed number of the discharge electrodes 5 and the collecting electrodes 4 are not limited to the illustrated example.

The collecting electrode 4 and the discharge electrode 5 are separated and electrically insulated from each other. The discharge electrode 5 is also insulated from the casing 2. The collecting electrode 4 is grounded, and the discharge electrode 5 is connected to a power source (not illustrated). The discharge electrode 5 is located at an intermediate position between the adjacent collecting electrodes 4.

The collecting electrode 4 is a discrete collecting electrode in which a plurality of pipe members 4a are arranged at predetermined intervals in the flow direction of the gas flow G. Each of the pipe members 4a is made of rigid metal. Each of the pipe members 4a is located in the vertical direction (the direction perpendicular to the paper surface) so that the axial line is orthogonal to the gas flow G. The respective pipe members 4a arranged in the gas flow G direction are fixed to each other by using a common frame body, so that the respective collecting electrodes 4 are independently constituted.

The discharge electrode 5 is disposed so as to be sandwiched between the collecting electrodes 4. Each of the discharge electrodes 5 includes a mounting base 7 and a plurality of corona discharge portions 8. The mounting base 7 is a rod-shaped or plate-shaped member made of a conductive material. The mounting base 7 is disposed substantially parallel to the collecting electrode 4 facing thereto.

Figure 2:
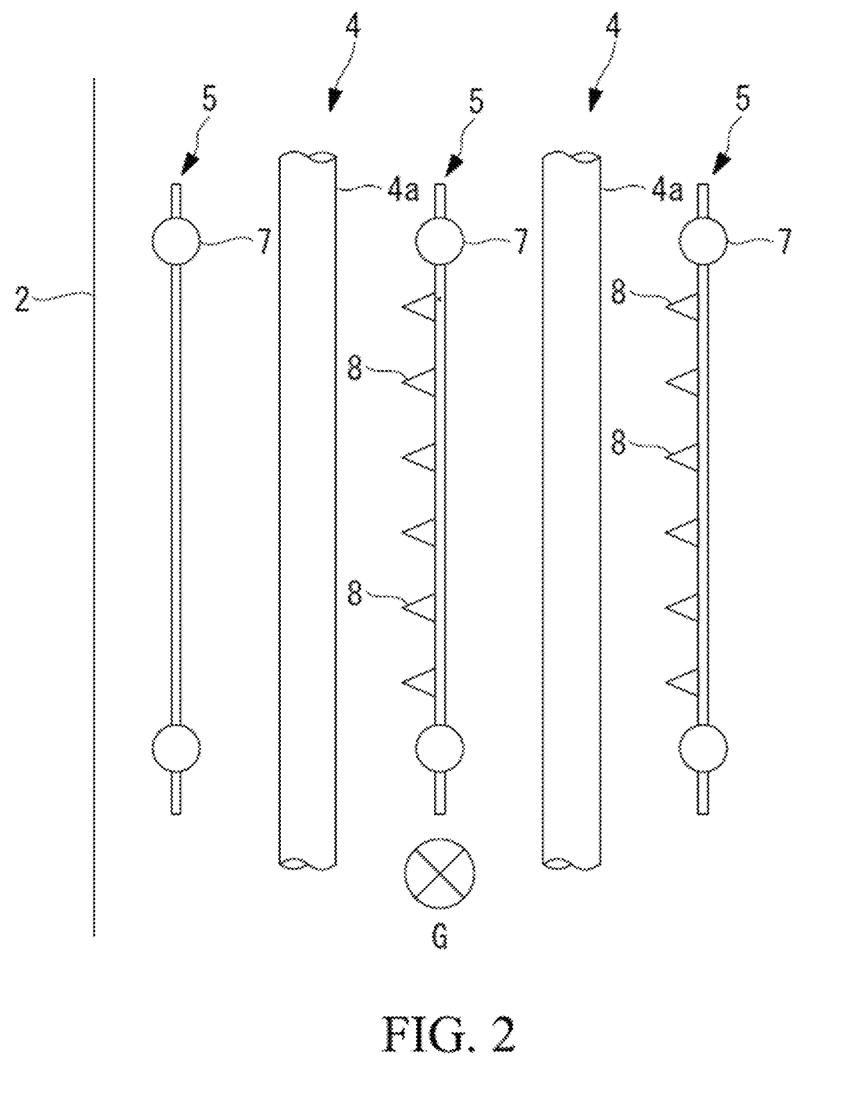
FIG. 2 is a partially enlarged view taken along line A-A of FIG. 1.

The corona discharge portion 8 generates corona discharge when a voltage is applied to the discharge electrode 5. The corona discharge portion 8 is a protrusion fixed to the mounting base 7 so as to protrude toward the collecting electrode 4 facing thereto, and has a spiny shape that is tapered to the tip. As illustrated in FIG. 2, a plurality of corona discharge portions 8 are disposed in a direction perpendicular to the gas flow G, that is, in a height direction. Each of the corona discharge portions 8 is disposed so as to be positioned at the center of the adjacent pipe members 4a in the gas flow G direction. However, the position of the corona discharge portion 8 in the gas flow G direction is not limited.

As illustrated in FIG. 1, the inside of the casing 2 is divided to form an upstream region S1 and a downstream region S2 in the gas flow G direction. That is, a region in which the collecting electrode 4 and the discharge electrode 5 are not provided is formed between the upstream region S1 and the downstream region S2.

The collecting electrode 4 and the discharge electrode 5 in the upstream region S1 and the collecting electrode 4 and the discharge electrode 5 in the downstream region S2 are arranged such that the corresponding collecting electrodes 4 and the corresponding discharge electrodes 5 are arranged on a respective same straight line in the gas flow G direction. It should be noted that the present invention is not limited to such a configuration in which the corresponding collecting electrodes 4 and the corresponding discharge electrodes 5 are arranged on the respective same straight line, and the collecting electrode 4 and the discharge electrode 5 in the downstream region S2 may be arranged so as to be respectively shifted from the corresponding collecting electrode 4 and the corresponding discharge electrode 5 in the upstream region S1 in a direction orthogonal to the gas flow G direction.

All of the corona discharge portions 8 in the upstream region S1 are attached in the same direction, i.e., upward in the drawing. On the other hand, all of the corona discharge portions 8 in the downstream region S2 are attached in a direction opposite to the upstream region S1, i.e., in the downward direction in the drawing.

A shielding plate 3a is fixed to the casing 2 at an upstream side corner portion to which the corona discharge portion 8 of the upstream region S1 is directed. A shielding plate 3b is fixed to the casing 2 at an upstream side corner portion to which the corona discharge portion 8 of the downstream region S2 is directed.

The shielding plates 3a and 3b block the gas from flowing between the casing 2 and the collecting electrode 4 adjacent to the casing 2, and guide the gas to flow between the other collecting electrode 4 and the discharge electrode 5.

The role of the blocking plates 3a and 3b is merely auxiliary, and their mounting methods and sizes are not particularly limited. The shielding plates 3a and 3b may be omitted.

Although not illustrated, the electrostatic precipitator 1 is provided with a hammering device for peeling off the particulate matter adhering to the collecting electrode 4. The hammering device includes a hammer, and the hammer hammers the collecting electrode 4 to peel and remove the particulate matter adhering to the surface by vibration.

The method of removing the particulate matter from the collecting electrode 4 is not limited to hammering using a hammering device. For example, the particulate matter may be removed from the collecting electrode 4 by a method of blowing a gas to the particulate matter collected by the collecting electrode 4 or a method of radiating a sound wave using a sonic horn. Further, the particulate matter may be removed from the collecting electrode 4 by cleaning with a cleaning liquid performed in a wet type electrostatic precipitator.

Next, the operation of the electrostatic precipitator 1 of the present embodiment will be described.

In the electrostatic precipitator 1, by applying a voltage to the discharge electrode 5, corona discharge is generated at the tip of the corona discharge portion 8. The particulate matter contained in the gas flow is charged by corona discharge. According to the collection principle of the conventional electrostatic precipitator, the charged particulate matter is attracted to the collecting electrode 4 by the Coulomb force and collected on the collecting electrode 4. However, in practice, the effect of the ionic wind greatly affects.

When the corona discharge occurs, negative ions are generated in the vicinity of the corona discharge portion 8, and the negative ions migrate toward the collecting electrode 4 by the electric field, and ionic wind is generated. The ionic wind flowing toward the collecting electrode 4 acts to cause the particulate matter contained in the gas flow to migrate to the vicinity of the collecting electrode 4. Thus, the particulate matter, which has a small particle diameter and is hardly charged, can be carried into the region where the Coulomb force acts, and the collection efficiency is improved.

Part of the ionic wind containing the particulate matter and flowing toward the collecting electrode 4 passes between the pipe members 4a of the collecting electrode 4.

In the upstream region S1, all of the corona discharge portions 8 are directed in one direction (upward direction in FIG. 1). Therefore, the ionic wind is directed in one direction, and the gas flow is directed obliquely upward in FIG. 1 as indicated by an arrow in the entire upstream region S1.

On the other hand, in the downstream region S2, all of the corona discharge portions 8 are directed in the opposite direction (downward direction in FIG. 1). Therefore, the ionic wind is directed in the opposite direction, and the gas flow is directed obliquely downward in FIG. 1 as indicated by an arrow in the entire downstream region S2.

According to the present embodiment, the following operational effects are obtained.

By providing the plurality of openings between the pipe members 4a of the collecting electrode 4, part of the ionic wind flowing from the discharge electrode 5 toward the collecting electrode 4 is allowed to escape to the back side of the collecting electrode 4. Thus, it is possible to suppress a flow in which the ionic wind is reversed and blows back by the collecting electrode 4.

The discharge electrode 5 includes a plurality of corona discharge portions 8, which are protruding toward only one collecting electrode 4 of the collecting electrodes 4 facing each other, and are continuously provided in the gas flow G direction. Thus, since the ionic wind can be made to flow toward only one side from the plurality of corona discharge portions 8 continuously provided in the gas flow G direction, the interference of the ionic wind from the corona discharge portions 8 adjacent in the gas flow direction can be reduced as much as possible to enhance the collection efficiency.

A plurality of collecting electrodes 4 and a plurality of discharge electrodes 5 are alternately arranged in a direction orthogonal to a gas flow G direction, and in each of an upstream region S1 and a downstream region S2 in the gas flow G direction, all corona discharge portions 8 are protruding in a same direction. Thus, the ionic wind is directed in a uniform direction across the plurality of collecting electrodes 4 in the whole of each of the regions S1 and S2, interference of the ionic wind is suppressed, and collection efficiency can be enhanced.

In the downstream region S2 that is downstream of the upstream region S1, all the corona discharge portions 8 are protruded in the opposite direction to the corona discharge portions 8 of the upstream region S1. Thus, the ionic wind deflected in one direction in the upstream region S1 is changed in the other direction in the downstream region S2, and the collection efficiency can be further enhanced.

Figure 3:
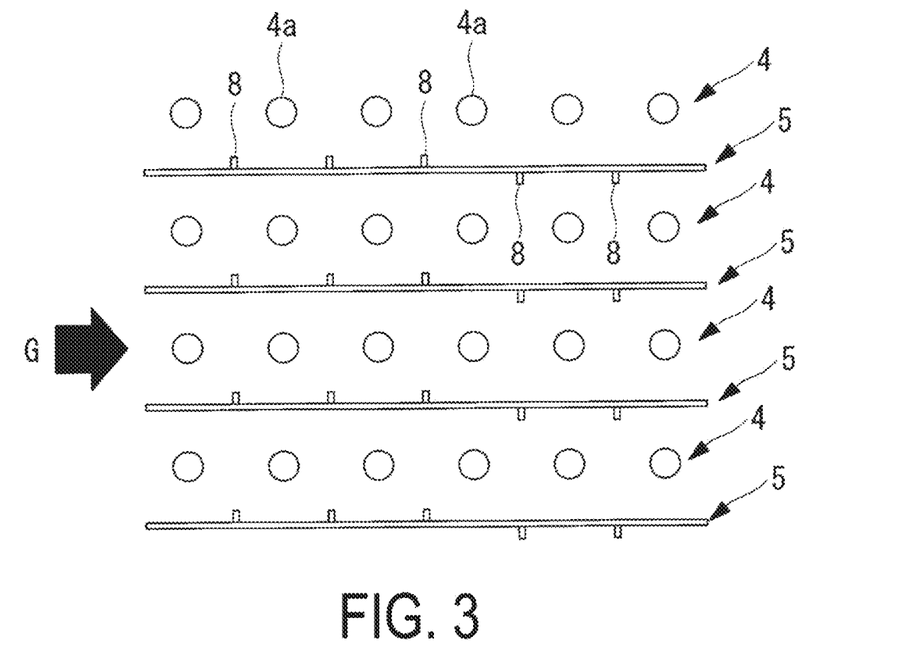
FIG. 3 is a horizontal cross-sectional view illustrating a modified example of an arrangement of corona discharge portions.
Figure 4:
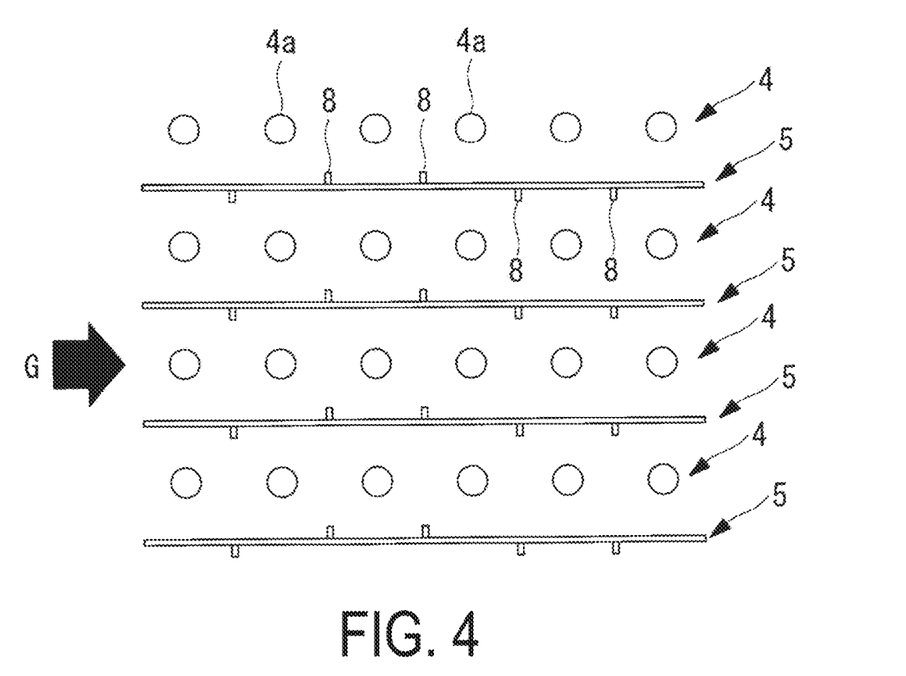
FIG. 4 is a horizontal cross-sectional view illustrating another modified example of an arrangement of corona discharge portions.

FIG. 3 illustrates a modified example of the orientation of the corona discharge portion 8. In the embodiment illustrated in FIG. 1, the direction of the corona discharge portion 8 is changed between the upstream region S1 and the downstream region S2, but the present invention is not limited thereto. For example, as illustrated in FIG. 3, the corona discharge portions 8 may be continuously provided (three consecutive in FIG. 3) only in one direction (upward direction in FIG. 3) over a predetermined section in the gas flow G direction, and then the corona discharge portions 8 may be continuously provided in the opposite direction (downward direction in FIG. 3). Even with such an arrangement of the corona discharge portions 8, it is possible to suppress the ionic wind from interfering due to the influence of the adjacent corona discharge portions 8, and to cause the ionic wind to flow in a direction intersecting the gas flow G over the plurality of collecting electrodes 4. Therefore, as in another modified example illustrated in FIG. 4, two consecutive corona discharge portions 8 may be alternately directed in opposite directions.

Figure 5A:
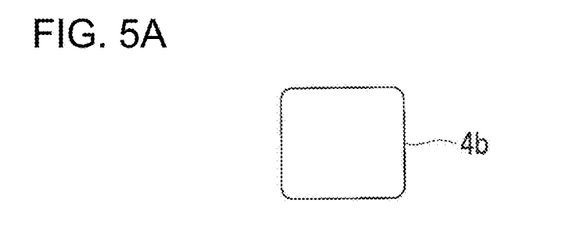
FIGS. 5A-5C are horizontal cross-sectional views illustrating a modified example of an outer shape of a cross section of a pipe member of the collecting electrode.
Figure 5B:
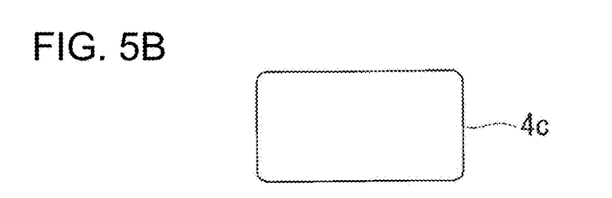
Figure 5C:
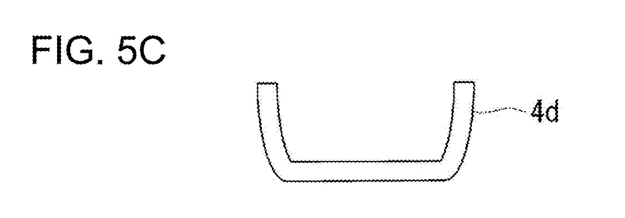

As in FIGS. 5A-5C, the outer shape of the cross section of the pipe member 4a of the collecting electrode 4 is not limited to a circular shape. For example, the collecting electrode 4 may include, as illustrated in FIG. 5A, the pipe member 4b that has a substantially square shape with rounded corners, as illustrated in FIG. 5B, the pipe member 4c that has a rectangular shape with rounded corners, or as illustrated in FIG. 5C, the channel member 4d that have a concave shape which is substantially U-shaped. That is, in the case of adopting the discrete collecting electrode 4 using a plurality of rod-like members, the pipe members 4a, 4b and 4c and the channel member 4d may include a cross section having a second moment of area of a predetermined value or more, which can ensure rigidity.

Figure 6:
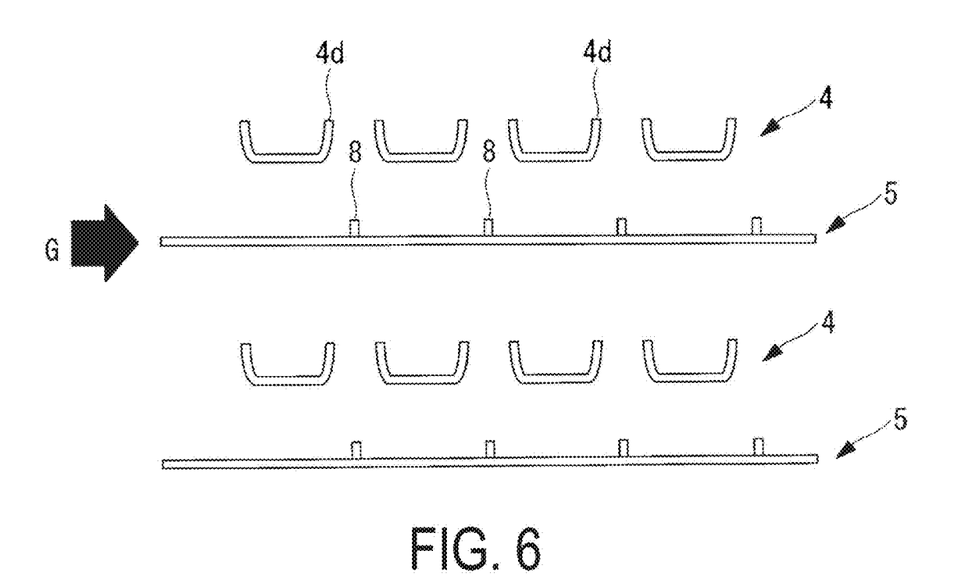
FIG. 6 is a horizontal cross-sectional view of an electrostatic precipitator using a channel member.

FIG. 6 illustrates an example in which the concave channel member 4d illustrated in FIG. 5C is disposed. As illustrated in the figure, the corona discharge portion 8 is disposed so as to face the convex side of the channel member 4d. With this arrangement, the ionic wind from the corona discharge portion 8 can easily escape to the back side of the channel member 4d. Each corona discharge portion 8 is arranged so as to be positioned at the center of the adjacent channel members 4d in the gas flow G direction. However, the position of the corona discharge portion 8 in the gas flow G direction is not limited.

Figure 7:
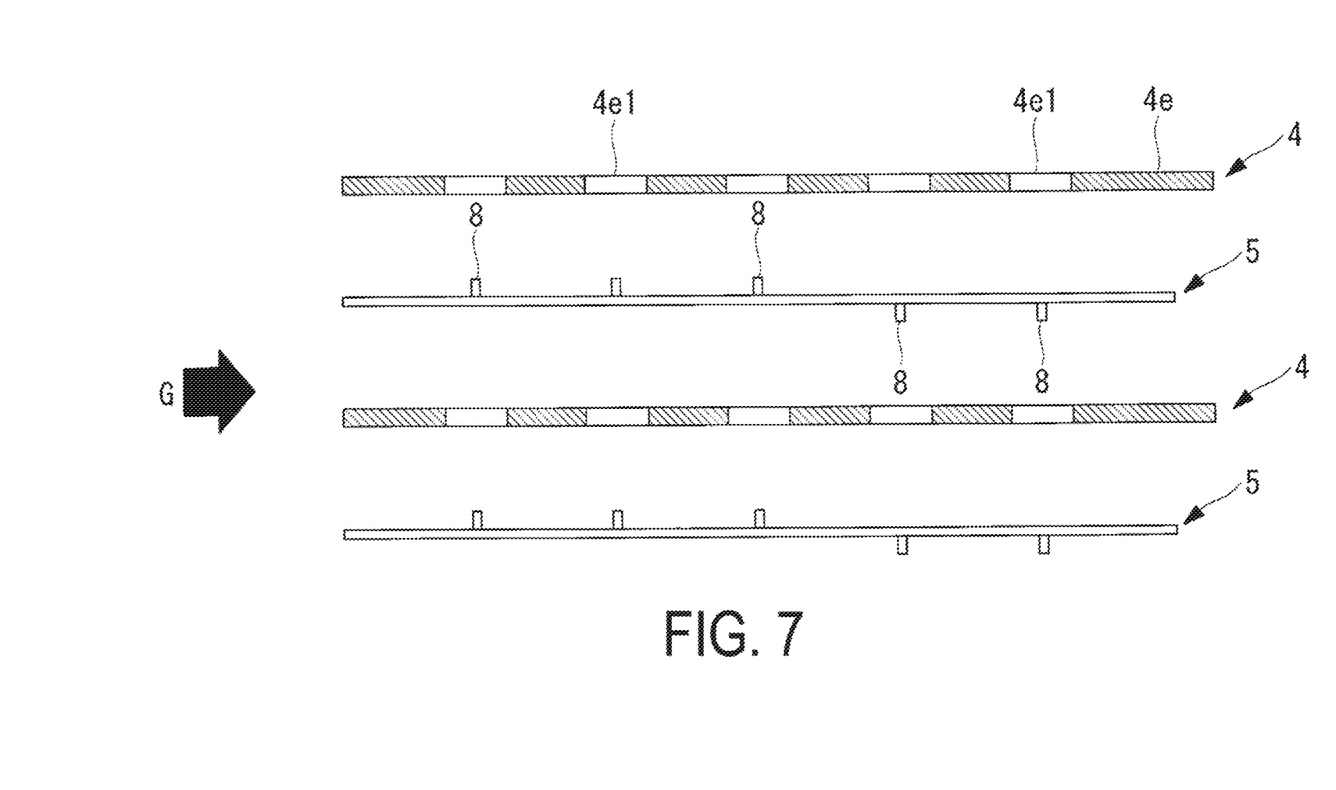
FIG. 7 is a horizontal cross-sectional view illustrating an electrostatic precipitator using a flat plate collecting electrode.

FIG. 7 illustrates a case where the collecting electrode 4 is constituted by a flat plate 4e using a perforated metal or the like, instead of the discrete collecting electrode 4 using a plurality of rod-like members. Through holes 4e1 having substantially the same shape are uniformly formed in the flat plate 4e. The shape of the through hole 4e1 may be circular, oval, or polygonal. Even with such a plate-shaped collecting electrode 4, the ionic wind can be caused to flow in the direction orthogonal to the gas flow G direction to pass through the collecting electrode 4 as in the above-described embodiment.

Figure 8:
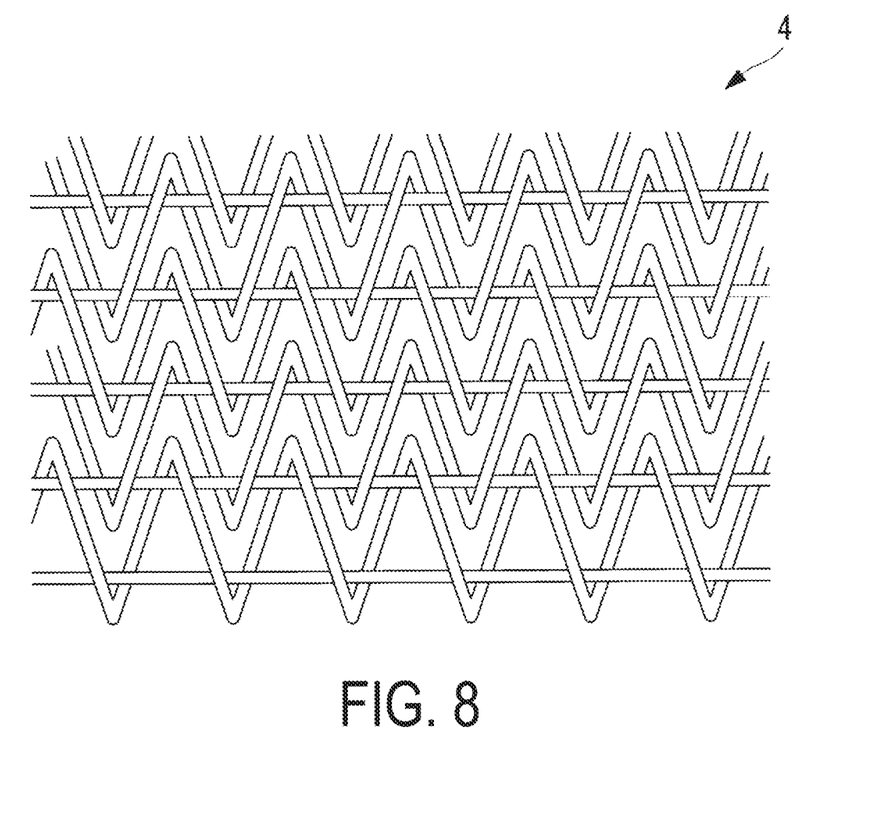
FIG. 8 is a partially enlarged view of a mesh belt.

As illustrated in FIG. 8, a mesh belt may be used as the collecting electrode 4. The mesh belt is formed by weaving thin metal wires in a planar shape and has flexibility. The mesh belt is wound around a plurality of rotary members (rotary drive rollers) in an endless state, and the mesh belt is configured to appropriately move between a gas flow path and the outside thereof. The dust adhering to the mesh belt is removed by the brush outside the gas flow path.

The invention claimed is:

1. An electrostatic precipitator, comprising:
   a casing including a gas inlet from which a gas flows in and a gas outlet from which the gas is discharged outside the casing;
   a collecting electrode configured to collect particulate matter by Coulomb force and provided in parallel along a gas flow direction of the gas that flows from the gas inlet to the gas outlet in the casing, including a plurality of openings being formed in the collecting electrode; and
   a discharge electrode arranged in parallel with the collecting electrode, wherein
   the collecting electrode comprises a plurality of collecting electrodes,
   the discharge electrode comprises a plurality of discharge electrodes,
   the plurality of the collecting electrodes and the plurality of the discharge electrodes are alternately arranged in a direction orthogonal to the gas flow direction,
   the discharge electrode includes a plurality of corona discharge portions for corona discharge, the plurality of corona discharge portions are continuously provided in the gas flow direction, and are protruding toward only one collecting electrode of the collecting electrodes that face each other, and
   each tip of the plurality of corona discharge portions is configured to be directed to one of the openings of the collecting electrode so that a part of an ionic wind flowing from the discharge electrode toward the collecting electrode escapes to a back side of the collecting electrode.

2. The electrostatic precipitator according to claim 1, wherein
   in a predetermined region in the gas flow direction, all of the plurality of corona discharge portions provided to each of the plurality of discharge electrodes similarly protrude in a first direction.

3. The electrostatic precipitator according to claim 2, wherein
   in a downstream region that is downstream of the predetermined region, all of the plurality of corona discharge portions provided to each of the plurality of discharge electrodes protrude in a second direction opposite to the first direction.

* * * * *